(12) United States Patent
Sutardja

(10) Patent No.: US 10,082,846 B2
(45) Date of Patent: Sep. 25, 2018

(54) TEMPERATURE SENSING SYSTEM

(75) Inventor: Sehat Sutardja, Los Altos Hills, CA (US)

(73) Assignee: Marvell World Trade Ltd., St. Michael (BB)

(*) Notice: Subject to any disclaimer, the term of this patent is extended or adjusted under 35 U.S.C. 154(b) by 3121 days.

(21) Appl. No.: 12/013,118

(22) Filed: Jan. 11, 2008

(65) Prior Publication Data

US 2008/0170947 A1 Jul. 17, 2008

Related U.S. Application Data

(60) Provisional application No. 60/908,269, filed on Mar. 27, 2007, provisional application No. 60/884,519, filed on Jan. 11, 2007.

(51) Int. Cl.
*H05K 5/00* (2006.01)
*G06F 1/20* (2006.01)
*G05D 23/19* (2006.01)
*G05D 23/20* (2006.01)

(52) U.S. Cl.
CPC .......... *G06F 1/206* (2013.01); *G05D 23/1931* (2013.01); *G05D 23/20* (2013.01)

(58) Field of Classification Search
CPC ..... G06F 1/206; G05D 23/1931; G05D 23/20
USPC .......... 318/471, 417; 454/184; 361/695, 690
See application file for complete search history.

(56) References Cited

U.S. PATENT DOCUMENTS

| | | | |
|---|---|---|---|
| 5,408,401 A * | 4/1995 | Miyazaki | 363/21.08 |
| 5,482,210 A * | 1/1996 | Carey et al. | 236/49.3 |
| 6,285,150 B1 * | 9/2001 | Adam et al. | 318/471 |
| 6,891,347 B2 * | 5/2005 | Dobbs et al. | 318/471 |
| 6,935,130 B2 * | 8/2005 | Cheng et al. | 62/259.2 |
| 7,412,347 B2 * | 8/2008 | Sherwood et al. | 702/130 |
| 2004/0047099 A1 * | 3/2004 | Pippin | 361/103 |
| 2004/0070932 A1 | 4/2004 | Dobbs et al. | |
| 2007/0210818 A1 * | 9/2007 | Goetz et al. | 324/760 |

FOREIGN PATENT DOCUMENTS

| | | |
|---|---|---|
| CN | 1412656 A | 4/2003 |
| CN | 1833201 A | 9/2006 |
| GB | 2 394 122 A | 4/2004 |
| JP | 01166116 A * | 6/1989 |

(Continued)

OTHER PUBLICATIONS

Notification of Transmittal of the International Search Report and the Written Opinion of the International Searching Authority, or the Declaration dated Dec. 8, 2009 in reference to PCT/US2008/000390 (13 pgs).

(Continued)

*Primary Examiner* — Steven B McAllister
*Assistant Examiner* — Jonathan Cotov

(57) ABSTRACT

A temperature sensing system includes N temperature sensing circuits, each including a diode, that are connected in series, wherein N is an integer greater than one. A control module includes a first terminal that communicates with one of the N temperature sensing circuits, that receives a combined voltage of the N temperature sensing circuits at the first terminal, and that calculates an average temperature of the N temperature sensing circuits based on the combined voltage.

34 Claims, 17 Drawing Sheets

(56) References Cited

FOREIGN PATENT DOCUMENTS

JP        2006-073887     3/2006
WO    WO2005002195    1/2005

OTHER PUBLICATIONS

Official Communication enclosing First Office Action dated Nov. 1, 2011 for Chinese Patent Application No. 200880002160.2; 11 pages.
Official Communication enclosing Second Office Action dated Aug. 21, 2012 for Chinese Patent Application No. 200880002160.2; 15 pages.

* cited by examiner

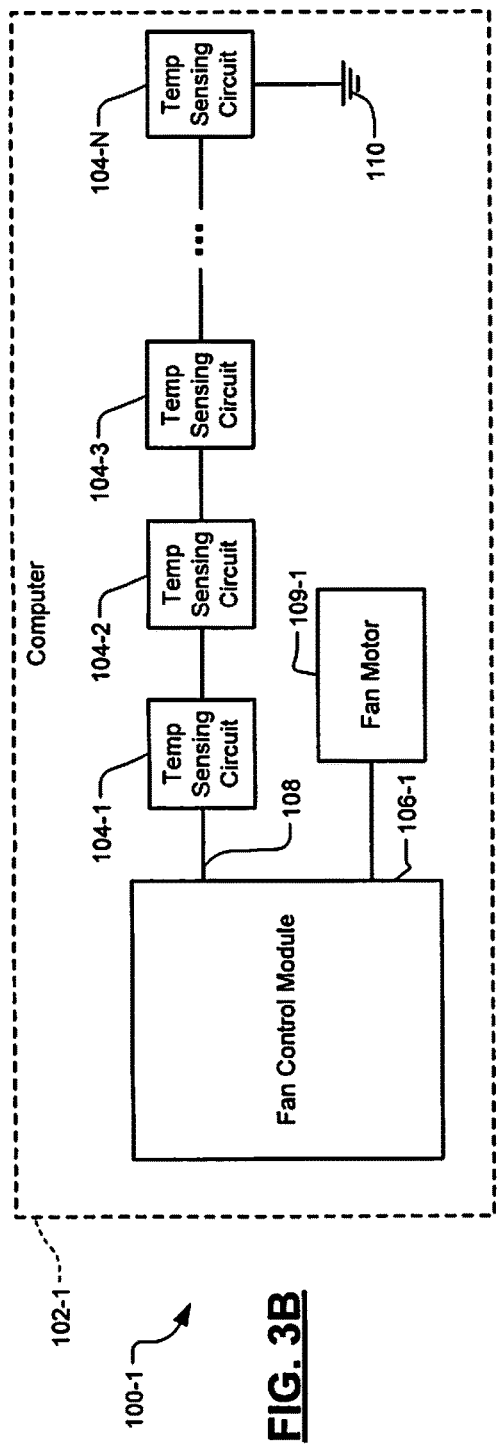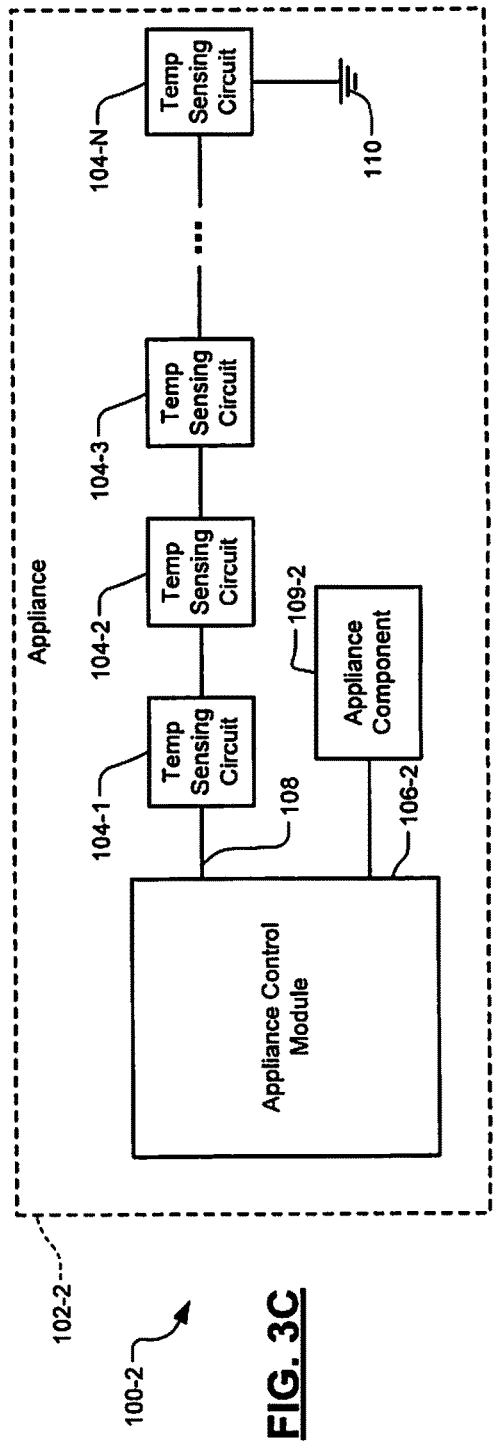
FIG. 3B
FIG. 3C

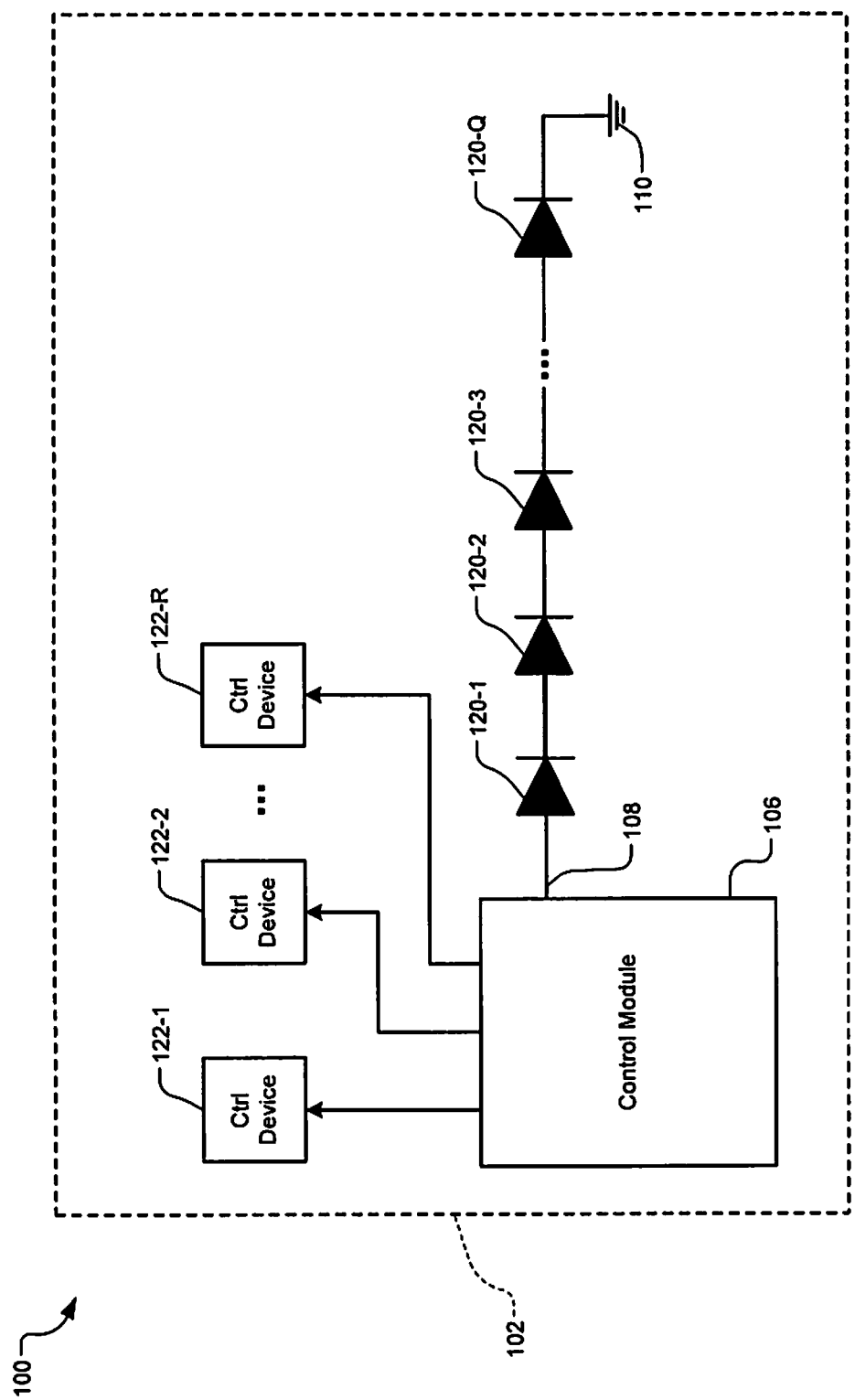

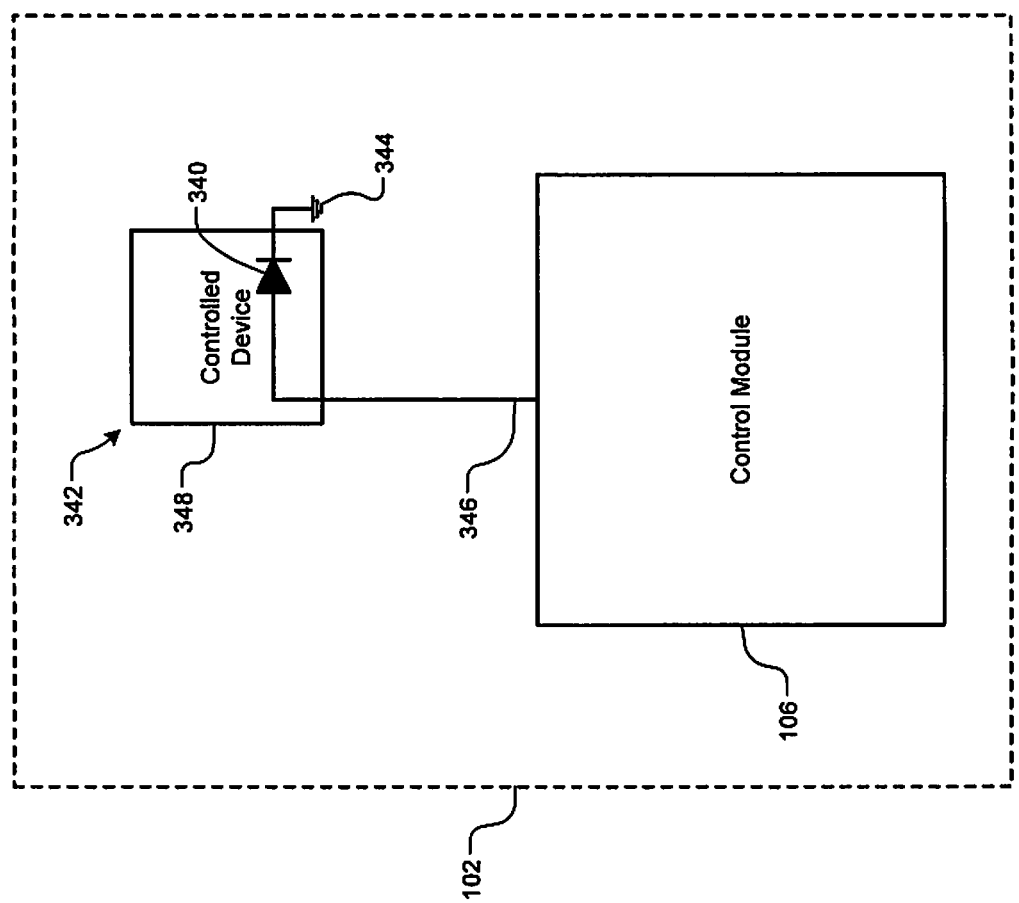

TEMPERATURE SENSING SYSTEM

CROSS-REFERENCE TO RELATED APPLICATIONS

This application claims the benefit of U.S. Provisional Application No. 60/908,269, filed Mar. 27, 2007, and U.S. Provisional Application No. 60/884,519, filed on Jan. 11, 2007. The disclosures of the above applications are incorporated herein by reference in their entirety.

FIELD

The present disclosure relates to sensing temperature at one or more locations, and more particularly to control systems and methods that adjust operation of a controlled device based on sensed temperature.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices such as computers (e.g. desktop and laptop computers) and video gaming consoles include one or more processors and memory. These computing devices generate heat during operation. The processing speed and power of these computing devices continue to increase while the size has stayed the same or decreased. As a result, the density of integrated circuits (ICs) that implement the processors and memory has increased. Due to the increased density, the operating temperature has also tended to increase.

Referring now to FIG. 1, an exemplary computer 10 is shown. The computer 10 includes components such as a motherboard 12, a power supply 14, a hard disk drive (HDD) 16, and optical drives 18 and 20. For example, the optical drive 18 may include a digital versatile disk (DVD) drive. The optical drive 20 may include a writeable DVD drive. The power supply 14 receives power from a power source and converts the power to a suitable level for the HDD 16, the optical drives 18 and 20, various components of the motherboard 12, and other components (not shown) of the computer 10.

The motherboard 12 includes components such as a central processing unit (CPU) 22, memory 24, and one or more removable component cards 30. For example, the removable component cards 30 may include, but are not limited to, a video graphics card, an audio card, and a wired or wireless network (e.g. Ethernet) card.

During operation, an operating temperature of the components of the computer 10 increases. In particular, the operating temperature of the processors and other integrated circuits (ICs), such as the CPU 22, graphical processors, and the memory 24, increases. Typically, the operating temperature increases as operating speeds of the components increase.

The motherboard 12 and other components of the computer 10 may be enclosed within a housing 32. The housing 32 may restrict air flow to the motherboard 12 and other components. The computer 10 may include one or more fans such as fans 34 and 36 to increase air flow to the components. For example, the fans 34 and 36 are arranged in openings in the housing 32. The fan 34 draws air 38 into the computer 10 through a first opening 40 in the housing 32 while the fan 36 expels the air 38 through a second opening 42. The air 38 tends to decrease the operating temperature of the various components. The fans 34 and 36 may receive power directly from the power supply 34 and/or via the motherboard 12.

Referring now to FIG. 2, the fans 34 and 36 may be operated as a single speed fan and/or a variable speed fan. Single speed fans are either on or off. Variable speed fans can be off or on at one of two or more speeds. The fan 34 may be operated as the single speed fan and the fan 36 may be operated as the variable speed fan. The fans 34 and 36 may be responsive to a temperature sensor 50 (e.g. a thermistor). The temperature sensor 50 is typically located on the motherboard 12.

The processor 22 or other component of the computer 10 may turn on a single speed fan when the sensed temperature is above a threshold and/or when the computer 10 is initially turned on. The processor 22 or other component of the computer 10 may operate a variable speed fan at a first speed when the sensed temperature is below the threshold and at a second speed when the sensed temperature is at or above the threshold. The second speed may also be varied to other speeds based on a difference between the sensed temperature and the threshold. In other words, the second speed may increase proportionately or in steps as the sensed temperature increases beyond the threshold.

Initially, the fans may operate at a minimum fan speed when the computer 10 is turned on or when the sensed temperature is above a fan turn-on threshold to provide air movement. Without the air movement, the temperature sensor 50 may not accurately sense the air temperature in the vicinity of the motherboard 12. With the air movement, the temperature sensor 50 senses an average temperature of the air within the computer 10. Typically, the fans operate at a maximum fan speed above a certain threshold, such as 45-50 degrees Celsius.

SUMMARY

A temperature sensing system includes N temperature sensing circuits that are connected in series and that each include a diode. N is an integer greater than one. A control module of the temperature sensing system includes a first terminal that communicates with one of the N temperature sensing circuits. The control module receives a combined voltage of the N temperature sensing circuits at the first terminal and calculates an average temperature of the N temperature sensing circuits based on the combined voltage.

In other features, the N diodes include a bipolar junction transistor (BJT). The control module determines a number of the diodes based on the combined voltage. The control module further determines the number of the diodes based on a known voltage for a single diode at a corresponding temperature. The control module further calculates the average temperature based on the number of diodes. The temperature sensing system includes memory that stores at least one of a previous combined voltage measurement value, a number of the diodes, and a predicted temperature.

In other features, a system includes the temperature sensing system and further includes a fan. The control module operates the fan based on the calculated average temperature. The control module at least one of turns on the fan and increases an operating speed of the fan when the calculated average temperature is greater than a first threshold. The control module at least one of turns off the fan and decreases the operating speed of the fan when the calculated average temperature is less than a second threshold that is less than the first threshold.

In other features, the control module includes a voltage measurement module that measures the combined voltage. The control module also includes a temperature calculation module that communicates with the voltage measurement module and that calculates the average temperature based on the combined voltage. The control module also includes a fan motor control module that communicates with the temperature calculation module and that operates the fan based on the average temperature.

In other features, the system includes a computing system that includes a housing. The N temperature sensing circuits are arranged in the housing. The system may also include an appliance that includes a housing. At least one of the N temperature sensing circuits is connected to at least one of a motor and a wiring connector of the fan. At least one of the N temperature sensing circuits is arranged at least one of on and within a housing of the fan. The control module at least one of turns the fan on and off and controls an operating speed of the fan using the first terminal. The computer system includes at least one of a desktop personal computer (PC) and a laptop PC.

In other features, one of the N temperature sensing circuits is arranged in a first location in the housing and another of the N temperature sensing circuits is arranged in a second location in the housing that is different from the first location. The temperature sensing system further includes P sets of the N temperature sensing circuits. Diodes in each of the P sets of the N temperature sensing circuits are connected in series. Each of the P sets of the N temperature sensing circuits communicates with one of P external terminals of the control module, respectively. P is an integer greater than zero.

In other features, a temperature control system includes a first fan and a first diode that is arranged at least one of on and within a housing of the fan. A fan control module includes a first terminal connected to a first end of the first diode. The control module measures a first voltage of the first diode at the first terminal and calculates a temperature of the first diode based on the first voltage measured at the first terminal. The control module operates the first fan based on the temperature.

In other features, a second end of the first diode is connected to a reference potential. The control module at least one of turns the first fan on and off and controls an operating speed of the first fan. The first diode includes a bipolar junction transistor (BJT). The control module at least one of turns on the first fan and increases an operating speed of the first fan when the temperature is greater than a first threshold. The control module at least one of turns off the first fan and decreases the operating speed of the first fan when the temperature is less than a second threshold that is less than the first threshold.

In other features, the fan control module at least one of turns the first fan on and off and controls an operating speed of the first fan using the first terminal. The temperature control system further includes a motherboard. The fan control module is arranged on the motherboard. The motherboard is arranged in a first location in the housing, and the first fan is arranged in a second location in the housing that is different from the first location.

In other features, the temperature control system includes a second fan and a second diode that is arranged at least one of on and within a housing of the second fan. The fan control module includes a second terminal that communicates with a first end of the second diode. The fan control module measures a second voltage of the second diode at the second terminal and calculates a second temperature of the second diode based on the second voltage measured at the second terminal. The fan control module also operates the second fan independently of the first fan based on the second temperature. The first diode is connected to at least one of a motor and a wiring connector of the first fan. The second diode is connected to at least one of a motor and a wiring connector of the second fan.

In other features, a method for operating a temperature sensing system includes providing N temperature sensing circuits, each including a diode, that are connected in series. N is an integer greater than one. The method also includes communicating with one of the N temperature sensing circuits with a first terminal of a control module. The method also includes receiving a combined voltage of the N temperature sensing circuits at the first terminal. The method also includes calculating an average temperature of the N temperature sensing circuits based on the combined voltage. The N diodes include a bipolar junction transistor (BJT).

In other features, the method includes determining a number of the diodes based on the combined voltage. The method also includes determining the number of the diodes based on a known voltage for a single diode at a corresponding temperature. The method also includes calculating the average temperature based on the number of diodes. The method also includes storing at least one of a previous combined voltage measurement value, a number of the diodes, and a predicted temperature. The method also includes operating a fan based on the calculated average temperature.

In other features, the method includes at least one of turning on the fan and increasing an operating speed of the fan when the calculated average temperature is greater than a first threshold. The method also includes at least one of turning off the fan and decreasing the operating speed of the fan when the calculated average temperature is less than a second threshold that is less than the first threshold. The method also includes measuring the combined voltage at a voltage measurement module and calculating the average temperature based on the combined voltage at a temperature calculation module. The method also includes operating the fan based on the average temperature.

In other features, at least one of the N temperature sensing circuits is connected to at least one of a motor and a wiring connector of a fan. At least one of the N temperature sensing circuits is arranged at least one of on and within a housing of a fan. The method includes at least one of turning the fan on and off and controlling an operating speed of the fan using the first terminal. The method also includes providing a computer system includes a fan and operating the fan based on the calculated average temperature. The method also includes providing an appliance includes a fan and operating the fan based on the calculated average temperature.

In other features, the computer system includes at least one of a desktop personal computer (PC) and a laptop PC. One of the N temperature sensing circuits is arranged in a first location in a housing and another of the N temperature sensing circuits is arranged in a second location in the housing that is different from the first location. The method also includes providing P sets of the N temperature sensing circuits Diodes in each of the P sets of the N temperature sensing circuits are connected in series. Each of the P sets of the N temperature sensing circuits communicates with one of P external terminals of the control module, respectively. P is an integer greater than zero.

In other features, a system includes a first controlled device, a control module, and N temperature sensing circuits, each including a diode, that are connected in parallel to the control module. N is an integer greater than one. The control module determines a temperature based on signals received from the N temperature sensing circuits and that adjusts operation of the first controlled device based on the temperature.

In other features, the N diodes include a bipolar junction transistor (BJT). The controlled device includes a fan, and wherein the control module operates the fan based on the temperature. The control module at least one of turns on the fan and increases an operating speed of the fan when the calculated average temperature is greater than a first threshold. The control module at least one of turns off the fan and decreases the operating speed of the fan when the calculated average temperature is less than a second threshold that is less than the first threshold.

In other features, the control module includes a voltage measurement module that measures voltages of the signals. The control module also includes a temperature calculation module that communicates with the voltage measurement module and that calculates the temperature based on the voltages. The control module also includes a fan motor control module that communicates with the temperature calculation module and that operates the fan based on the temperature.

In other features, a computer system includes the system and further includes a housing. The N temperature sensing circuits are arranged in the housing. Alternatively, an appliance includes the system and further includes a housing. At least one of the N temperature sensing circuits is connected to at least one of a motor and a wiring connector of the fan. At least one of the N temperature sensing circuits is arranged at least one of on and within a housing of the fan. The control module at least one of turns the fan on and off and controls an operating speed of the fan using the first terminal.

In other features, the computer system includes at least one of a desktop personal computer (PC) and a laptop PC. The control module averages the signals of the N temperature sensing circuits to determine the temperature. The control module generates a weighted average of the signals of the N temperature sensing circuits to determine the temperature. The control module compares the signals of the N temperature sensing circuits to N thresholds, respectively, and adjusts operation of the controlled device when M of the N outputs exceed the N thresholds. M is an integer greater than zero and/or M is greater than or equal to N/2.

In other features, a method includes providing a first controlled device and providing N temperature sensing circuits, each including a diode, that are connected in parallel to a control module. N is an integer greater than one. The method also includes determining a temperature based on signals received from the N temperature sensing circuits. The method also includes adjusting operation of the first controlled device based on the temperature.

In other features, the N diodes include a bipolar junction transistor (BJT). The controlled device includes a fan. The method further includes operating the fan based on the temperature. The method includes at least one of turning on the fan and increasing an operating speed of the fan when the calculated average temperature is greater than a first threshold. The method also includes at least one of turning off the fan and decreasing the operating speed of the fan when the calculated average temperature is less than a second threshold that is less than the first threshold.

In other features, the method includes measuring voltages of the signals, calculating the temperature based on the voltages, and adjusting a speed of the fan based on the temperature. The method also includes arranging the N temperature sensing circuits in a housing of a computing system. The method also includes arranging the N temperature sensing circuits in a housing of an appliance. The method also includes connecting at least one of the N temperature sensing circuits to at least one of a motor and a wiring connector of the fan. The method also includes arranging at least one of the N temperature sensing circuits at least one of on and within a housing of the fan.

In other features, the method includes at least one of turning the fan on and off and controlling an operating speed of the fan using the first terminal. The computer system includes at least one of a desktop personal computer (PC) and a laptop PC. The method also includes averaging outputs of the N temperature sensing circuits to determine the temperature. The method also includes using a weighted average of outputs of the N temperature sensing circuits to determine the temperature. The method also includes comparing N outputs of the N temperature sensing circuits to N thresholds, respectively. The method also includes adjusting operation of the controlled device when M of the N outputs exceed the N thresholds. M is an integer greater than zero and/or M is greater than or equal to N/2.

In other features, a temperature sensing system includes N temperature sensing means for sensing temperature, each including a diode. The N temperature sensing means are connected in series. N is an integer greater than one. The temperature sensing system also includes control means for including a first terminal that communicates with one of the N temperature sensing means. The control means also receives a combined voltage of the N temperature sensing circuits at the first terminal and calculates an average temperature of the N temperature sensing means based on the combined voltage.

In other features, the N diodes include a bipolar junction transistor (BJT). The control means determines a number of the diodes based on the combined voltage. The control means further determines the number of the diodes based on a known voltage for a single diode at a corresponding temperature. The control means further calculates the average temperature based on the number of diodes. The temperature sensing system further includes memory means for storing at least one of a previous combined voltage measurement value, a number of the diodes, and a predicted temperature.

In other features, a system includes the temperature sensing system and further includes fan means for adjusting temperature. The control means operates the fan means based on the calculated average temperature. The control means at least one of turns on the fan and increases an operating speed of the fan when the calculated average temperature is greater than a first threshold. The control means at least one of turns off the fan and decreases the operating speed of the fan when the calculated average temperature is less than a second threshold that is less than the first threshold.

In other features, the control means includes voltage measurement means for measuring the combined voltage and temperature calculation means for communicating with the voltage measurement means and for calculating the average temperature based on the combined voltage. The control means also includes fan motor control means for communicating with the temperature calculation means and for operating the fan based on the average temperature. The system includes a computing system that includes a housing. The N temperature sensing means are arranged in the housing. The system alternatively includes an appliance that includes a housing. The N temperature sensing means are arranged in the housing.

In other features, at least one of the N temperature sensing means is connected to at least one of a motor and a wiring connector of the fan means. At least one of the N temperature sensing means is arranged at least one of on and within a housing of the fan means. The control means at least one of turns the fan on and off and controls an operating speed of the fan means using the first terminal. The computer system includes at least one of a desktop personal computer (PC) and a laptop PC.

In other features, one of the N temperature sensing means is arranged in a first location in the housing and another of the N temperature sensing means is arranged in the housing in a second location that is different from the first location. The temperature sensing system further includes P sets of the N temperature sensing means. Diodes in each of the P sets of the N temperature sensing means are connected in series. Each of the P sets of the N temperature sensing means communicates with one of P external terminals of the control means, respectively. P is an integer greater than zero.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A, 3B, and 3C are functional block diagrams of a temperature sensing system that includes temperature sensing circuits connected in series according to the present disclosure;

FIG. 4A is a functional block diagram of a temperature sensing system that includes diodes according to the present disclosure;

FIG. 9 is a functional block diagram of a controlled device that includes an integrated temperature sensing diode according to the present disclosure;

DETAILED DESCRIPTION

Figure 2:
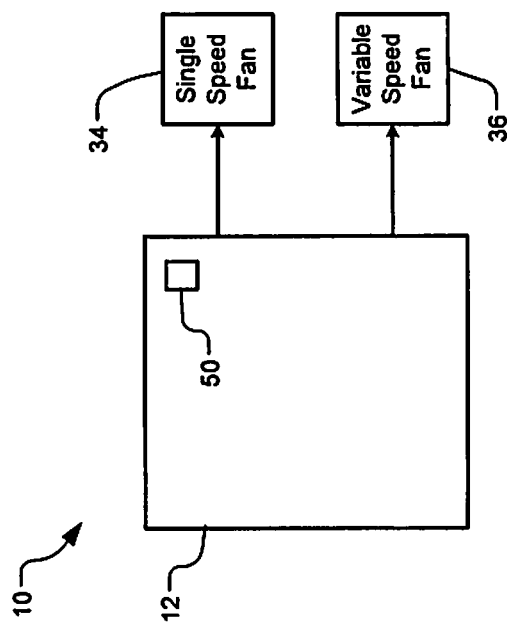
FIG. 2 is a functional block diagram of a computer including a single speed fan and a variable speed fan according to the prior art.
Figure 1:
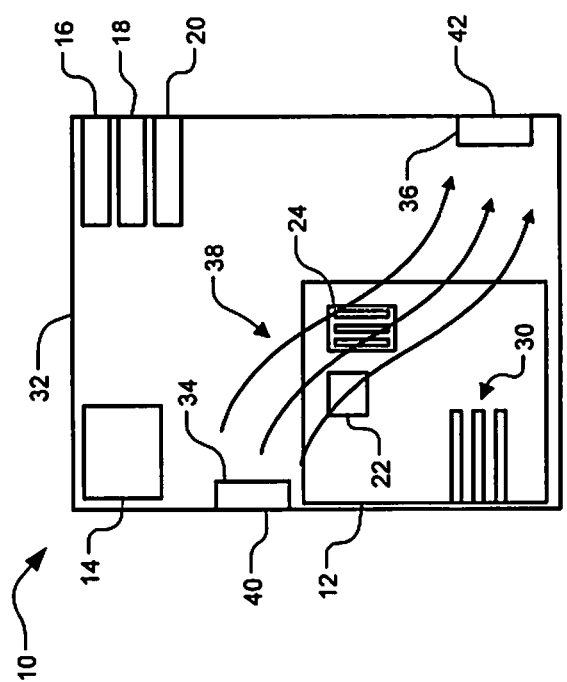
FIG. 1 illustrates a computer that includes fans according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A temperature sensor may be arranged at a particular location in devices such as computing devices (such as personal computers, printers, laptops, personal digital assistants, notebooks, etc.), appliances (such as refrigerators, stoves, air-conditioning units, dryers, washers, etc) or other devices. The temperature sensor senses a temperature of air flowing across the temperature sensor. As such, the temperature sensor senses an average temperature of components of the device.

The sensed temperature may be used as feedback to control operation of another device. For example, the sensed temperature may be used to selectively turn on a fan in a computer to heat and/or cool components within the computer. Heating may involve the use of a heat source such as a resistive heater. Heating may also involve slowing down a fan to increase the temperature at a location. The reduced cooling allows heat-producing components to increase the temperature.

Temperatures of locations that are remote from the temperature sensor may not be at the same as the temperature sensed by the temperature sensor. In other words, temperatures within the computing devices, appliances or other devices are not necessarily uniform. Certain locations may experience higher (or lower) temperatures than the sensed temperature. For example, when the sensed temperature is 50° C., a temperature at a particular location may be 75° C. or more. When a fan is set to operate at a maximum speed above a threshold (or below a threshold for heating), the location may be at a significantly higher (or lower) temperature than the threshold before the sensed temperature is high (or low) enough to trigger the maximum speed of the fan. The component at the location may be damaged by the high (or low) temperature.

While the present disclosure describes a temperature sensing system in the context of controlling a fan that is used to heat or cool components of a device that are arranged in an enclosure, the present disclosure applies to any system that senses temperature and uses the temperature as a control variable for controlling a device. For example, a similar approach can be used to heat components by selectively turning on a fan to direct air across a resistive heater.

Figure 3A:
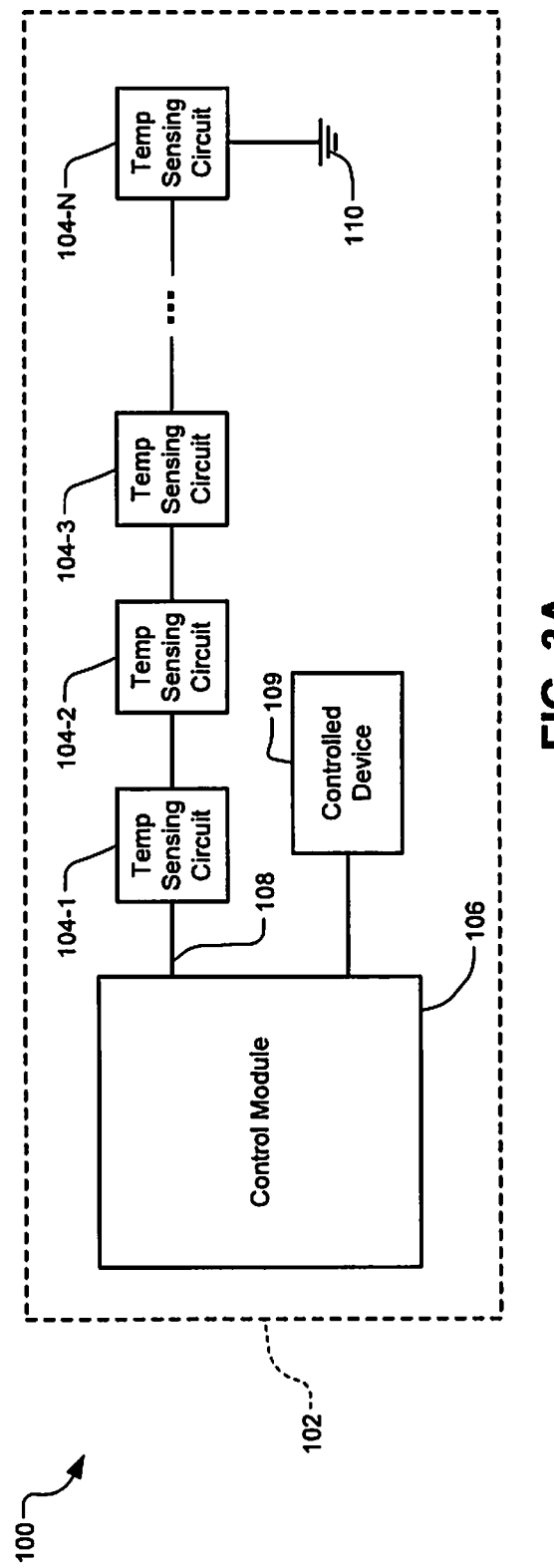

Referring now to FIGS. 3A-3C, various temperature sensing systems are shown. In FIG. 3A, a temperature sensing system 100 for a device 102 such as a computing device, appliance or other device includes one or more distributed sensing circuits 104-1, 104-2, 104-3, . . . , and 104-N (referred to collectively as sensing circuits 104). Each of the sensing circuits 104 includes, for example, an electronic circuit and/or logic circuit that senses a temperature of a corresponding location. For example, the sensing circuits 104 may output a voltage based on temperature. Each of the sensing circuits 104 may be arranged at a different location within the device 102. The sensing circuits 104 are connected in series with a control module 106 that may use the sensed temperature as a control variable for controlling a controlled device 109.

In FIG. 3B, a temperature sensing system 100-1 is shown. The device 102 comprises a computer 102-1 including a housing. The control module 106 includes a fan control module 106-1. The controlled device 109 may include a fan motor 109-1. The temperature sensing circuits 104 may sense a temperature in the housing of the computer 102-1 and adjust operation of the fan motor 109-1 as will be described below.

In FIG. 3C, a temperature sensing system 100-2 is shown. The device 102 comprises an appliance 102-2. The control module 106 includes a control module 106-2. The controlled device 109 may include an appliance component 109-2. The temperature sensing circuits 104 may sense a temperature in the housing of the computer and adjust operation of the appliance component 109-2 as will be described below. The appliance component 109-2 may include a motor, a fan, a pump, a valve, an actuator or other device that is controlled based on temperature.

In FIGS. 3A-3C, the control module 106 may be integrated with a processor on a motherboard. The control module 106 may also be a stand-alone device and/or integrated with another component. The control module 106 may determine whether a temperature of a location corresponding to one of the sensing circuits 104 is above a threshold and operate one or more controlled devices accordingly.

By connecting the temperature sensors in series, the amount of wire connecting the temperature sensors to the control module 106 may be reduced. In other words when multiple sensors are connected in parallel, each of the sensors is connected back to the control module 106. With a series connection, the temperature sensors are connected to a next temperature, a preceding temperature sensor and/or the control module in a loop. Depending upon the layout, less wire may be used, which reduces cost.

For example only, the control module 106 may determine the temperature based on a voltage measurement at a single terminal 108, referenced to a reference potential such as ground 110. Those skilled in the art can appreciate that the control module 106 may determine the temperature based on an absolute voltage measurement and/or a voltage change measurement.

Figure 3D:
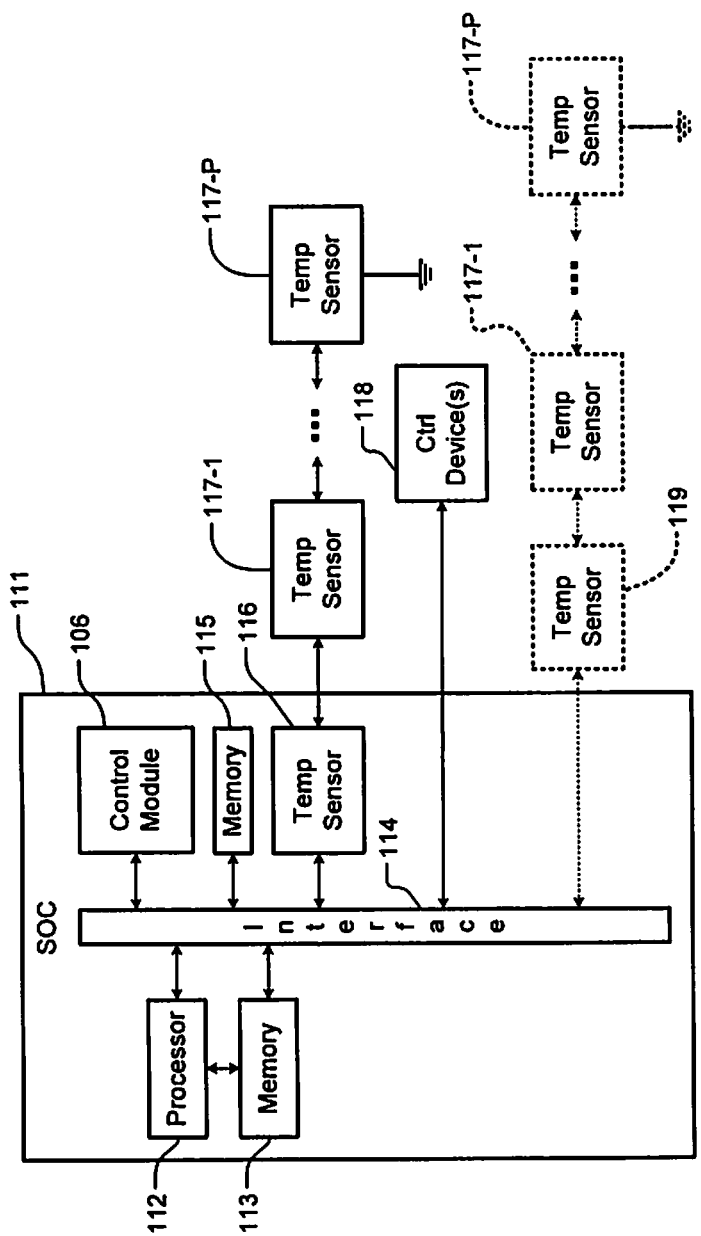
FIG. 3D is a functional block diagram of an exemplary system on chip including a processor, memory and a control module.

Referring now to FIG. 3D, a system on chip (SOC) 111 may comprise a processor 112, memory 113 such as cache and an interface 114. The SOC 111 may also include additional memory 115 such as random access memory (RAM), read only memory (ROM), flash memory, etc. The memory can be on-chip or off-chip. The SOC 111 may include an on-chip temperature sensor 116. One or more other temperature sensor(s) 117-1, . . . , and 117-P (collectively 117) communicate in series with the on-chip temperature sensor 116. However, a parallel connection arrangement may also be used between the sensors and the interface 114 of the SOC 111 as shown in FIG. 6B. One or more controlled devices 118 communicate with the SOC 111. The control module 106 controls the controlled devices 118 based on the sensed temperature.

Alternately, the SOC 111 may include an off-chip temperature sensor 119 arrange in close proximity to or in contact with the SOC 111. The one or more other temperature sensor(s) 117 communicate in series with the temperature sensor 119. The temperature sensor 116 or 119 monitors a temperature of the SOC 111, as will be described below.

Referring now to FIG. 4A, the temperature sensing system 100 is shown to include diodes 120-1, 120-2, 120-3, . . . , and 120-Q (referred to collectively as diodes 120). For example only, each of the sensing circuits 104 (as shown in FIG. 3) may include one of the diodes 120. The diodes 120 may be connected in series to the control module 106. The control module 106 may measure a change in voltage across the diodes 120. In the present implementation, the voltage across the diodes may be referenced to a reference potential such as ground 110. The voltage change of the diodes 120 corresponds to the temperature (e.g. an average temperature) change of the diodes 120. The control module 106 determines the temperature based on the voltage change and operates the controlled device(s) accordingly.

When the voltage change indicates that the average temperature of the diodes 120 is above a threshold, the control module 106 turns on a controlled device and/or adjusts an operating parameter of the controlled device. For example, when the controlled device includes one or more fans, the control module may turn on, vary the number of operating fans and/or increase a speed of one or more of the fans. For example, the control module 106 may turn on two or more of controlled devices 122-1, 122-2, . . . , and 122-R (referred to collectively as controlled devices 122), and/or may turn on a particular controlled device (e.g. the controlled device 122-1) that corresponds to a location. In other words, the control module 106 is responsive to an average temperature that corresponds to an average temperature of the locations within the device 102. When one or more of the diodes 120 that correspond to the locations increases, the average temperature (and the voltage measurement/change) changes accordingly.

Figure 4B:
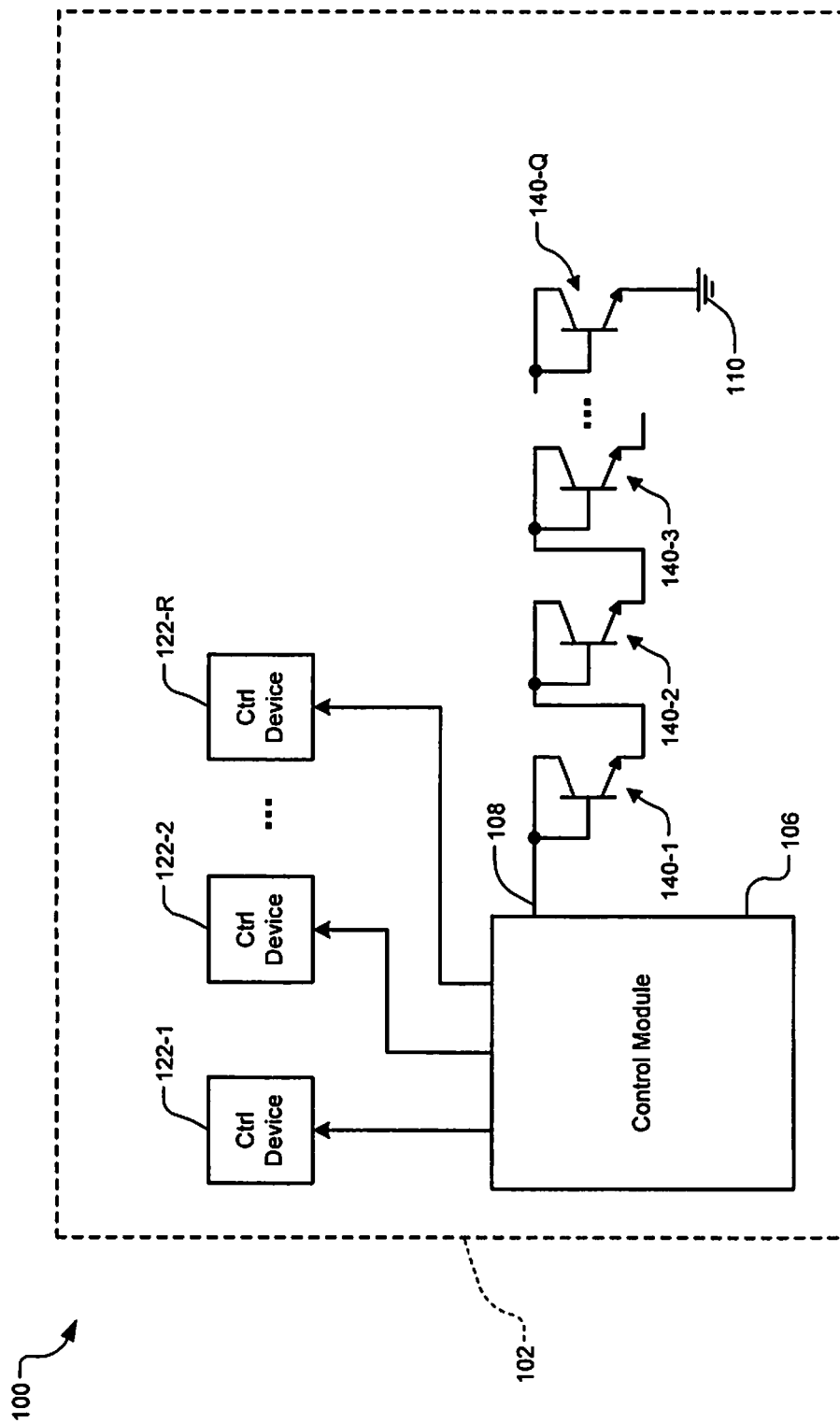
FIG. 4B is a functional block diagram of a temperature sensing system that includes bipolar junction transistors (BJTs) according to the present disclosure.

Referring now to FIG. 4B, the temperature sensing system 100 is shown to include bipolar junction transistors (BJTs) 140-1, 140-2, 140-3, ..., and 140-Q, referred to collectively as BJTs 140. For example, each of the diodes 120 may include one of the BJTs 140. The BJTs are connected in series with the control module 106. As described in FIG. 4A with respect to the diodes 120, a voltage $V_{be}$ across the base-emitter junctions of the BJTs 140 varies with temperature. The control module 106 measures a change of the voltage $V_{be}$ (or thermal voltage kt/q) and determines the temperature of the BJTs 140 based on the measured voltage $V_{be}$.

Figure 5:
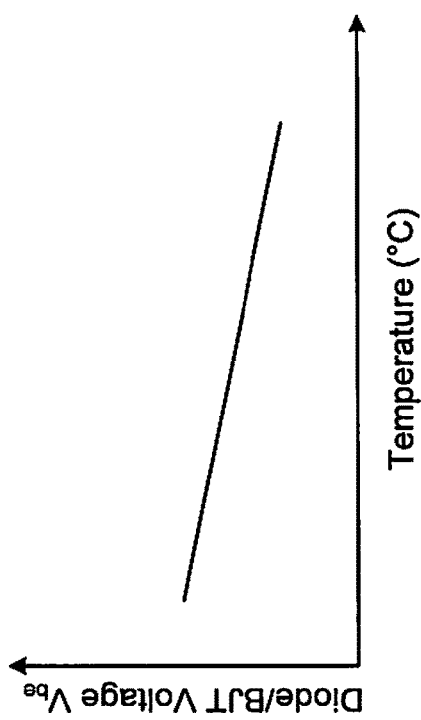
FIG. 5 is a graph that illustrates a relationship between diode voltage and temperature.

Referring now to FIG. 5, diode (or BJT) voltage $V_{be}$ is shown as a function of temperature. When current through the diode is constant, changes in the temperature cause a corresponding change in the voltage $V_{be}$. When the current is known, the control module 106 can determine the temperature based on the change in the voltage $V_{be}$. Typically, the voltage decreases as the temperature increases. The voltage $V_{be}$ change may vary based on the type of device (i.e. the type of diode and/or BJT) used and/or the current through the device.

In FIG. 4A, the measured voltage corresponds to a sum of the voltages $V_{be}$ for all of the diodes 120. As such, the voltage change corresponds to a sum of the voltage changes of each of the diodes 120. In other words, an overall voltage change $\Delta V_{be}$ determined at the control module 106 is the sum of the voltage changes $\Delta V_{be1}, \Delta V_{be2}, \Delta V_{be3}, \ldots$, and $\Delta V_{ben}$:

$$\Delta V_{be} = \Delta V_{be1} + \Delta V_{be2} + \Delta V_{be3} + \ldots + \Delta V_{ben}$$

Consequently, the voltage $V_{be}$ measured at the control module 106, as well as the corresponding voltage change $\Delta V_{be}$, is indicative of an average temperature change in locations corresponding to each of the diodes 120.

The measured absolute voltage of the diodes 120 is indicative of the number of the diodes 120 in the temperature sensing system 100. For example, when an expected voltage measurement of a single one of the diodes 120 is $xV_{be}$, a voltage measurement of $nxV_{be}$ indicates that the temperature sensing system 100 includes N diodes 120. The control module 106 may determine a number of the diodes 120 connected in the temperature sensing system 100 based on the voltage measurement. For example, the control module 106 may divide the voltage measurement by an expected voltage measurement for a single diode.

Figure 6A:
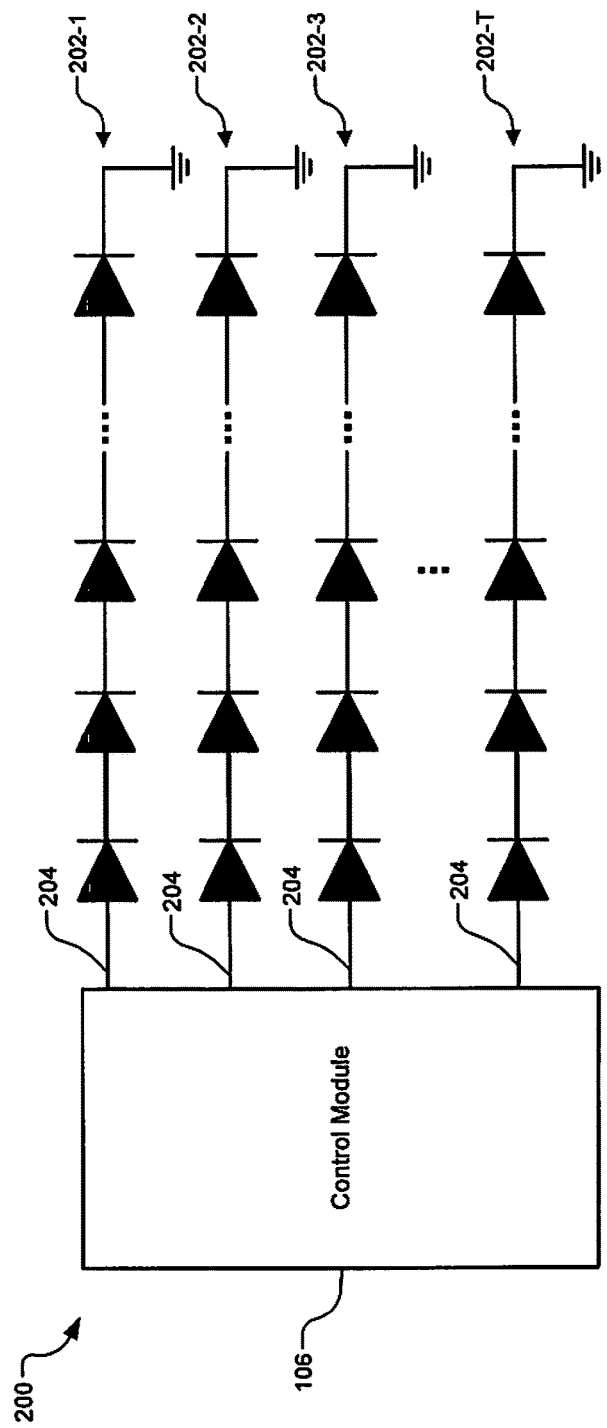
FIG. 6A is a functional block diagram of a temperature sensing system that includes a plurality of sets of diodes connected in series according to the present disclosure.
Figure 6B:
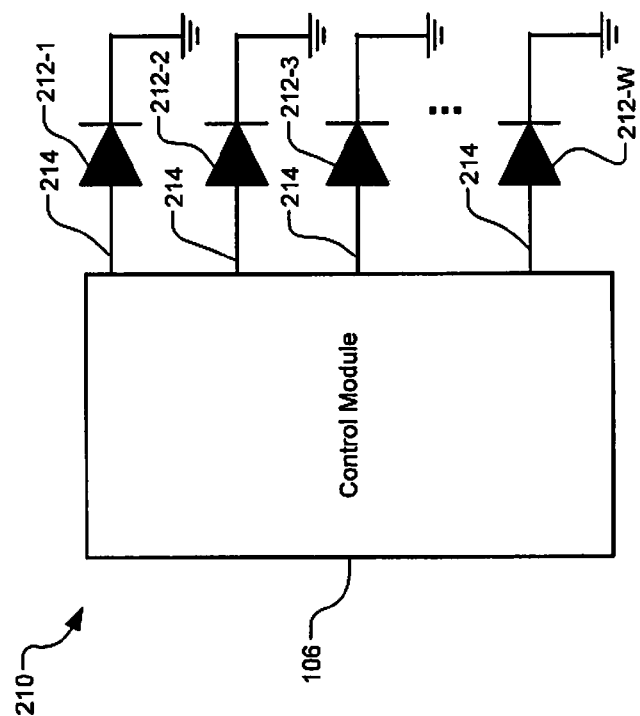
FIG. 6B is a functional block diagram of a temperature sensing system that includes a plurality of diodes connected in parallel according to the present disclosure.

Referring now to FIG. 6A, a temperature sensing system 200 includes multiple sets of series-connected diodes. The sets are connected in parallel to the control module. For example, the control module 106 is connected to diode sets 202-1, 202-2, 202-3, ..., and 202-T (referred to collectively as diode sets 202). The control module 106 measures respective voltages of each of the diode sets 202 independently to determine corresponding temperatures of various locations. In this implementation, multiple terminals 204 of the control module 106 are used. In other words, one of the terminals 204 is used for each of the diode sets 202.

Referring now to FIG. 6B, a temperature sensing system 210 includes multiple diodes connected in parallel. For example, the control module 106 is connected to diodes 212-1, 212-2, 212-3, ..., and 212-W (referred to collectively as diodes 212). The control module 106 measures respective voltages of each of the diodes 212 independently to determine corresponding temperatures of various locations. In this implementation, multiple terminals 214 of the control module 106 are used. In other words, one of the terminals 214 is used for each of the diodes 212.

When multiple diodes are connected in parallel, averaging can be used. Alternately, selection of the temperature may be based on weighting. For example only, one of the diodes may be weighted differently than others of the diodes. Each of the diodes may have the same or different turn on thresholds. Each of the diodes may have the same or different turn off thresholds. Voting may be used for control. In other words, each of the diodes may vote on whether operation of the fan or other controlled device should be adjusted and a decision may be made based on a decision of M of the N diodes where M and N are integers. Each diode may have the same weighting. Alternately, some of the diodes may be weighted differently than others of the diodes. Furthermore, any variation of the foregoing may be used.

Figure 7:
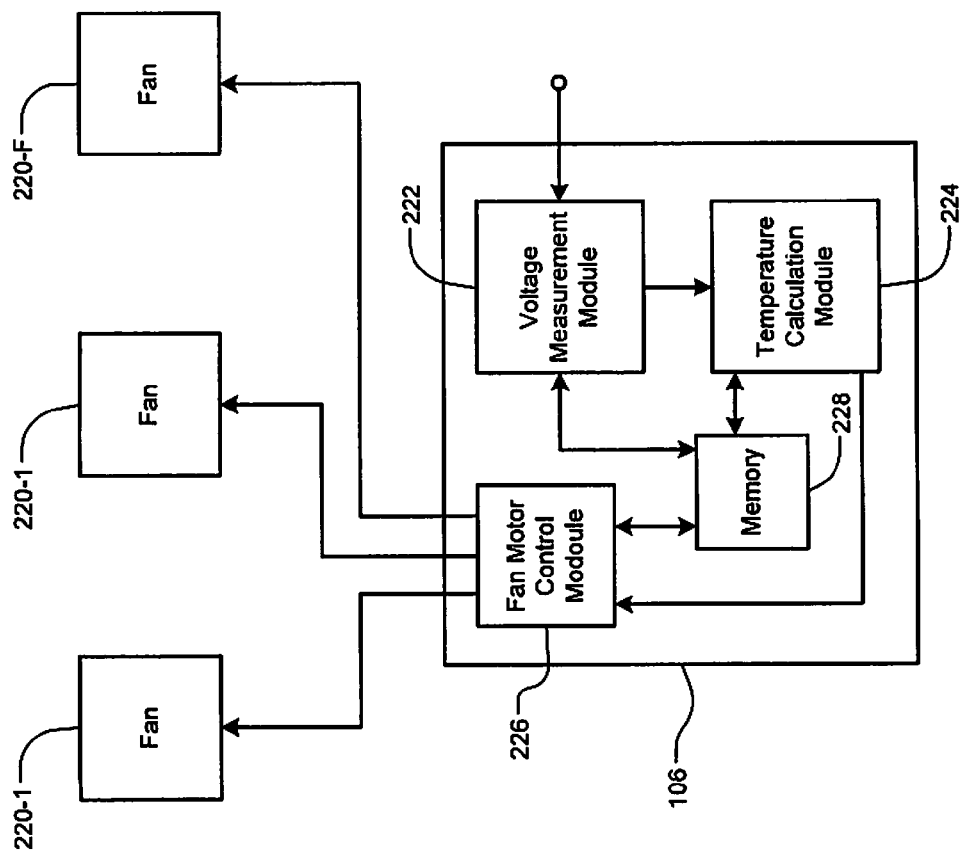
FIG. 7 is a functional block diagram of a fan control module according to the present disclosure.

Referring now to FIG. 7, an exemplary implementation incorporating fans is shown. The control module 106 controls one or more fans 220-1, 220-2, ..., and 202-F based on voltage measurements of the diodes as described above with respect to FIGS. 3-6. For example, when the fans 220 are single speed fans, the control module 106 turns on the fans 220 when the voltage measurement is above a first threshold. When the fans 220 are variable speed fans, the control module 106 may operate the fans 220 at a first speed when the voltage measurement is above a first threshold and operate the fans 220 at a second speed when the voltage measurement is above a second threshold.

The control module 106 includes a voltage measurement module 222, a temperature calculation module 224, and a fan motor control module 226. The voltage measurement module 222 measures the absolute voltage of one or more sets of diodes as described above with respect to FIGS. 4-6. The voltage measurement module 222 may determine a voltage change based on stored previous voltage measurements. The temperature calculation module 224 communicates with the voltage measurement module 222 and calculates a temperature that corresponds to the voltage measurement and/or a temperature change that corresponds to the voltage change.

For example only, the control module 106 may include memory 228 that stores previous voltage measurements and corresponding temperature measurements. The memory 228 may store a lookup table populated with voltages and/or voltage changes and corresponding temperatures. The temperature calculation module 224 may determine temperature measurements based on the lookup table.

The memory 228 may store a known number of diodes in a particular set of diodes. As the number of the diodes increases, varied temperature changes to specific ones of the diodes may have a greater effect on the absolute voltage measurement. For example, the temperature at a particular location may result in a negligible voltage at the corresponding diode. Consequently, as the number of the diodes increases, the absolute voltage measurement may be less accurate as an indicator of the number of the diodes. The control module 106 may use known average temperature measurements to compensate for temperature effects on the absolute voltage measurement.

For example only, the control module 106 may determine the known number of diodes based on voltage measurements at the known average temperatures. When the computing device is initially turned on, the control module 106 may take a voltage measurement of a set of diodes. The control module 106 may further require a prior off time greater than a predetermined period to ensure that residual heating (e.g. due to prior operation) has dissipated. Alternatively, the control module 106 may assume an initial temperature. The control module 106 may assume an initial temperature that is approximately equivalent to a known ambient temperature. Further, the memory 228 may store a plurality of predicted temperature values for a particular number of diodes. The control module 106 determines the number of diodes in the set based on the voltage measurement, the initial and/or predicted temperatures, and a known voltage of a single diode as described above with respect to FIG. 4A.

The fan motor control module 226 communicates with the temperature calculation module 224 and controls the operation of the fans 220 accordingly. For example, the fan motor control module 226 may operate the fans 220 based on comparisons between the temperatures and various thresholds stored in the memory 228. The thresholds may vary for particular diode sets.

In addition, hysteresis may be used to control the controlled device. For example in a fan control implementation, one or more fans may be turned on when the sensed temperature exceeds a first temperature threshold and turned off when the sensed temperature falls below a second temperature threshold. The second temperature threshold may be a temperature that is different than or lower than the first temperature threshold.

Figure 8A:
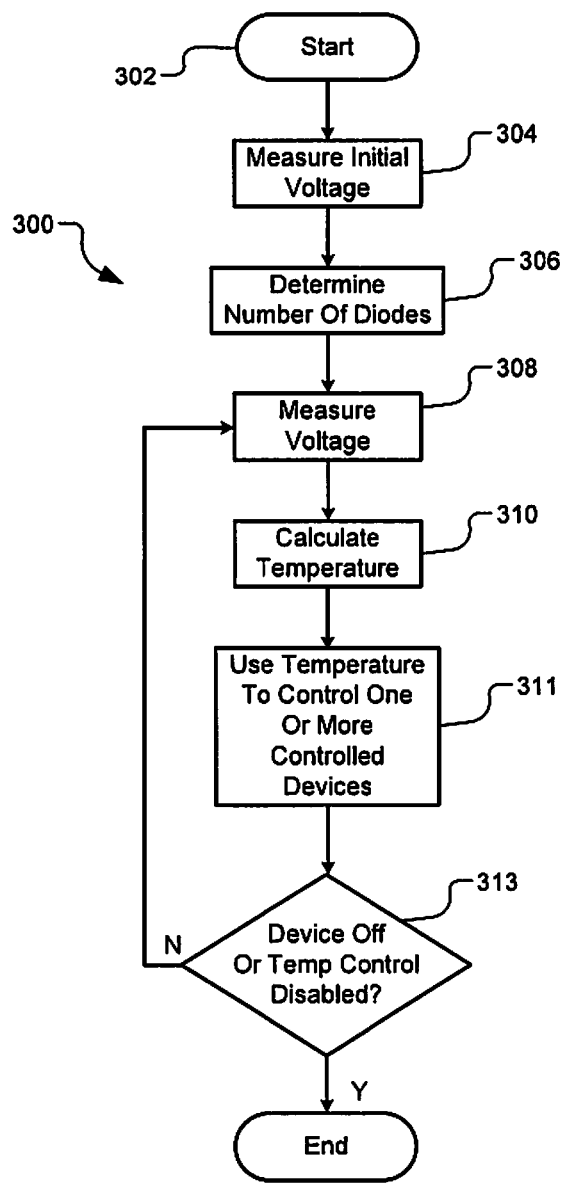
FIGS. 8A, 8B and 8C are exemplary flow diagrams that illustrate a method for operating a temperature sensing system according to the present disclosure.
Figure 8B:
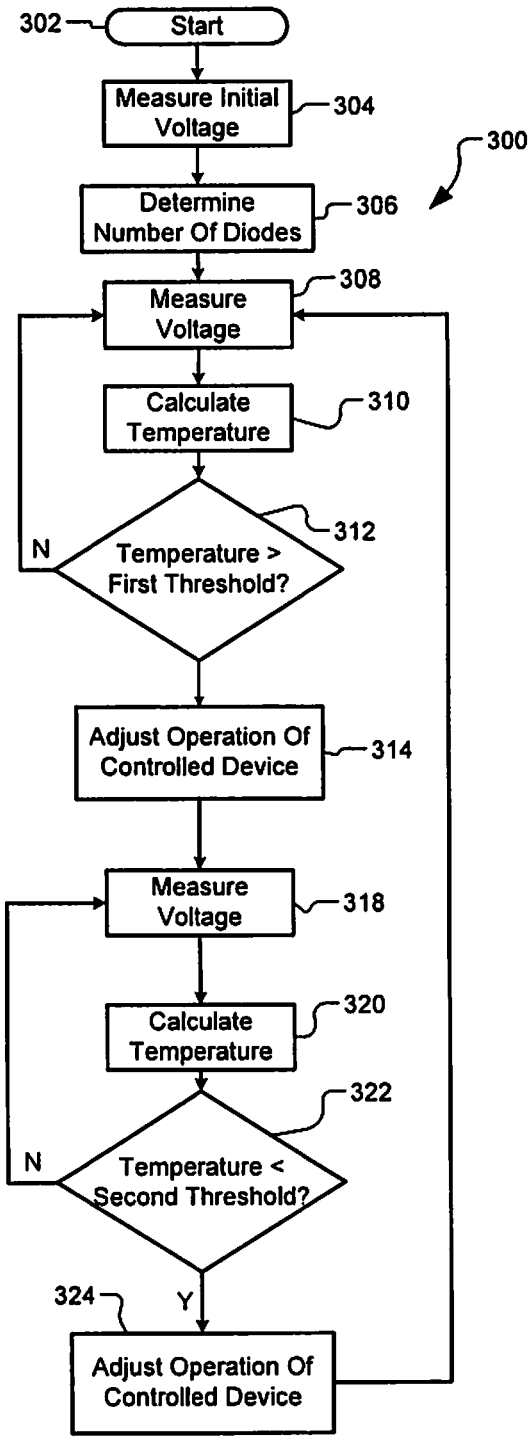
Figure 8C:
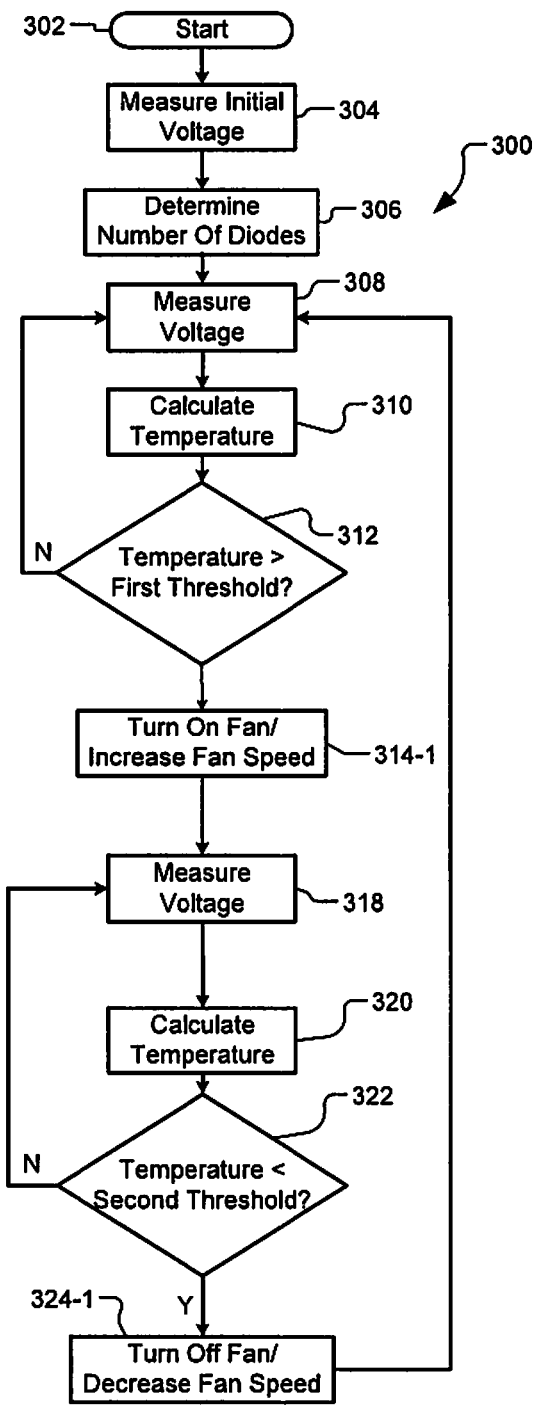

Referring now to FIGS. 8A-8C, control of one or more controlled devices and one or more fans, respectively, are shown. In FIG. 8A, the control module 106 controls a controlled device based on sensed temperature. In FIG. 8B, the control module 106 controls a controlled device based on first and second temperature thresholds. In FIG. 8C, the control module 106 controls a fan motor based on first and second temperature thresholds. Similar references numbers are used in FIGS. 8A-8C to identify similar steps.

In FIG. 8A, a method 300 for operating the control module 106 starts in step 302. In step 304, the control module 106 measures an initial voltage of one or more diode sets (e.g. when the computing device is turned on). In step 306, the control module 106 determines a number of diodes in the diode set based on the initial voltage and a known temperature. In step 308, the control module 106 measures an operating voltage and/or a voltage change of the diodes. In step 310, the control module 106 calculates a temperature and/or a temperature change based on the voltage measurement and the number of diodes. In step 311, the control module 106 uses the sensed temperature to control a controlled device. In step 313, control determines whether the device is off and/or temperature control has been disabled. If step 313 is true, control ends. Otherwise, control returns to step 308.

In FIG. 8B, steps in common with FIG. 8A will not be discussed. In step 312, the control module 106 determines whether the temperature is greater than a first threshold. If true, the method 300 continues to step 314. If false, the method 300 continues to step 308. In step 314, the control module 106 adjusts operation of the controlled device(s).

In step 318, the control module measures the operating voltage. In step 320, the control module 106 calculates the temperature based on the voltage measurement and the number of diodes. In step 322, the control module 106 determines whether the temperatures is less than a threshold. For example, the threshold may be the first threshold used in step 312. Alternately, the threshold may be a second threshold that is greater than or less than the first threshold. In other words, the control module 106 may operate the fans at the selected speed until the temperature is less than a second threshold (that is less than the first threshold). The use of a different threshold may reduce cycling of the fan on or off unnecessarily and provide hysteresis. If true, the method 300 continues to step 324. If false, the method 300 continues to step 318. In step 324, control adjusts operation of the controlled device. Those skilled in the art can appreciate that the control module 106 may employ a plurality of thresholds to switch between corresponding operating modes and speeds.

In FIG. 8C, steps in common with FIG. 8B will not be discussed. In step 314-1, the control module 106 turns on and/or increases the operating speed of one or more controlled devices that correspond to the diode set. For example, when the fans in the computing device are initially off during operation, the control module 106 turns the fans on in step 314-1. When the fans in the computing device are initially on during operation, the control module 106 increases (or decreases) the operating speed of the fans in step 314-1. In step 324-1, the control module turns off and/or decreases (or increases) the operating speed of the fans.

Figure 8D:
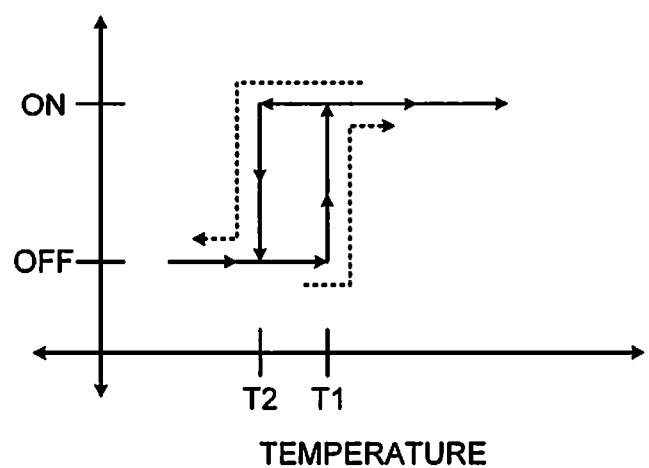
FIGS. 8D and 8E illustrate hysteresis used with temperature thresholds.
Figure 8E:
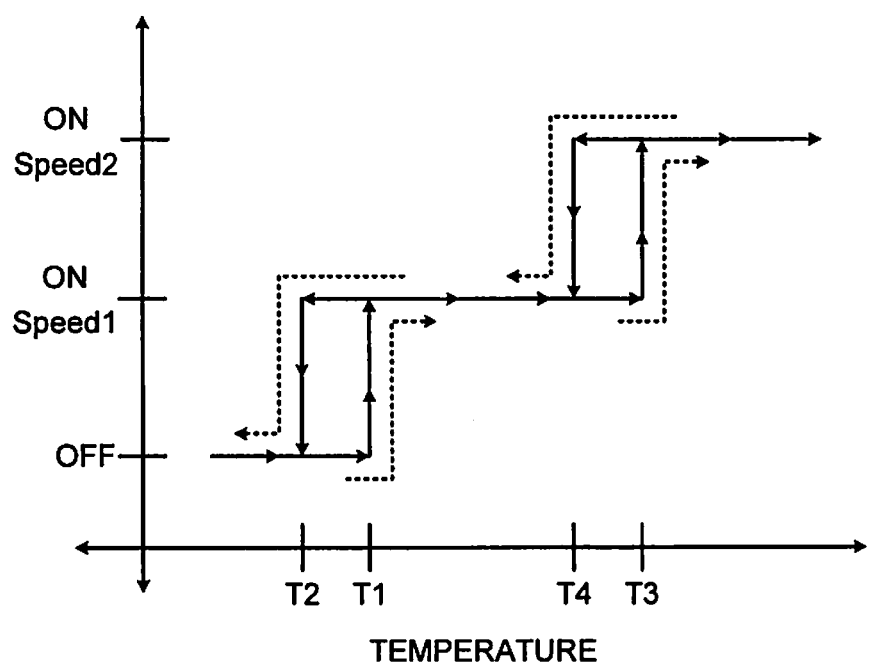

Referring now to FIGS. 8D and 8E, hysteresis may be used to control operation of the controlled device based on temperature. In FIG. 8D, when the controlled device is in a first operating state and the temperature increases above a first threshold temperature T1, the control module adjusts operation of the controlled device to a second operating state. When the controlled device is in the second operating state and the temperature decreases below a second threshold temperature T2, the control module adjusts operation of the controlled device to the first operating state. For example only, the first operating state may correspond to an off state and the second operating state may correspond to an on state. Alternately, the first and second operating states may correspond to first and second speeds of the controlled device.

In FIG. 8E, operation of the controlled device can be adjusted in two or more steps. Both steps may use hysteresis as shown in FIG. 8D. When the controlled device is in the second operating state and the temperature increases above a third threshold temperature T3, the control module adjusts operation of the controlled device to a third operating state. When the controlled device is in the third operating state and the temperature decreases below a fourth threshold temperature T4, the control module adjusts operation of the controlled device to the second operating state. For example only, the first operating state may correspond to an off state, the second operating state may correspond to an on state at a first speed, the third operating state may correspond to an on state at a second speed. Still other variations are contemplated.

Referring now to FIG. 9, a diode 340 may be integrated with a controlled device 342. For example only, each of the diodes 212 (connected in parallel as shown in FIG. 6B) and/or each of the diode sets 202 (as shown in FIG. 6A) may be integrated with one of the controlled devices 342. The diode 340 may be connected to internal circuitry of the controlled device 342 and a reference potential such as ground 344. The control module 106 communicates with the diode 340 and the controlled device 342 and measures a voltage and/or voltage change of the diode 340.

The control module 106 calculates a temperature of the diode 340 based on the voltage measurement. In other words, the control module 106 determines a temperature near a particular controlled device 342 (i.e. a corresponding location). The diode 340 is connected to a single terminal 346 of the control module 106. Those skilled in the art can appreciate that a plurality of the diodes 340 (connected in series and/or in parallel) can be used in each of the controlled devices 342. Alternately, a plurality of the controlled devices 342, each including at least one of the respective diodes 340, may be used. The control module 106 may independently operate the plurality of the controlled devices 342 based on temperatures of the diodes 340, respectively.

The diode 340 may be arranged in or on a housing or assembly 348 that includes the controlled device 342. As such, the diode 340 is located proximate to the controlled device 342 within the device 102. In this manner, temperature calculations of the diode may be correlated to a temperature of a location that corresponds to a particular controlled device or a location within a controlled device.

Figure 10:
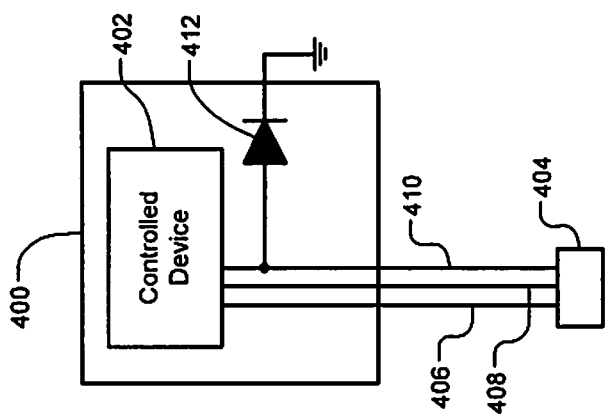
FIG. 10 is a functional block diagram of a controlled device that includes a temperature sensing diode wired through a connector according to the present disclosure.

Referring now to FIG. 10, a controlled device 402 is connected to the control module 106 via a wiring connector 404. The controlled device 402 may include a housing 400. For example only, the connector 404 may include a 3-wire connection to the control module 106. Wires 406 and 408 provide power to the controlled device 402 and wire 410 is connected to one or more diodes 412. In other words, the diode 412 is connected to the control module 106 via the connector 404. The wire 410 may be a fault detection wire that detects faults in the controlled device 402 and outputs a signal to the control module 106 accordingly. The diode 412 shares the connection to the control module 106 with the wire 410.

The control module 106 measures the voltage of the diode 412 and detects the presence of one or more of the diodes 412 based on a signal on the wire 410 as described above with respect to FIGS. 3-9. The control module 106 determines temperature based on the voltage measurement and controls the controlled device 402 accordingly. Further, the control module 106 may initiate a shutdown mode based on detection of the diode 412. For example only, when the control module 106 does not detect any of the diodes 412, the control module 106 initiates the shutdown mode (e.g. the diode 412 may not be connected or may be damaged).

In the shutdown mode, the control module 106 may direct the device 102, via the motherboard 12, to power down. In other words, when no temperature sensing diodes are connected to the wire 410 and/or the controlled device control module detects a controlled device fault via the wire 410, the device 102 may power down to prevent damage from overheating.

Figure 11:
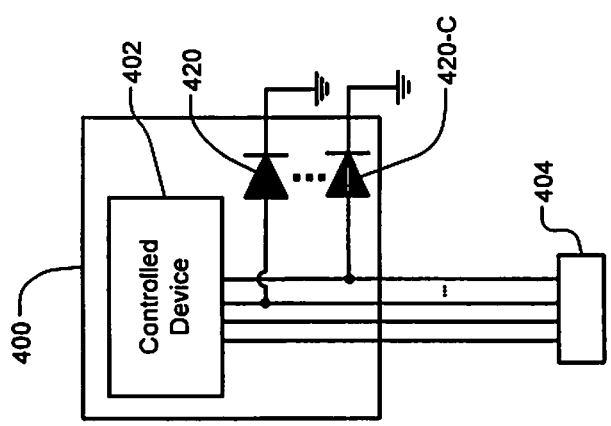
FIG. 11 is a functional block diagram of a controlled device that includes a plurality of parallel-connected temperature sensing diodes wired through a connector according to the present disclosure.

Referring now to FIG. 11, a plurality of parallel-connected diodes 420-1 . . . 420-C (referred to collectively as diodes 420 are used). The connector 404 is a (2+C)-wire connector, where C is a number of the diodes 420. Each of the diodes 420 may be integrated with the controlled device and/or arranged in another location in the device.

Figure 12:
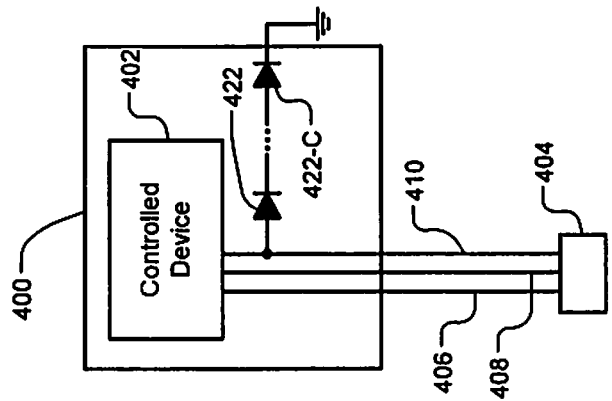
FIG. 12 is a functional block diagram of a controlled device that includes a set of series-connected temperature sensing diodes wired through a connector according to the present disclosure.

Referring now to FIG. 12, a plurality of series-connected diodes 422-1 . . . 422-C (referred to collectively as diodes 422) are used. Each of the diodes 422 may be integrated with the controlled device and/or arranged in another location in the device.

As can be appreciated, the controlled devices in FIGS. 9-12 may include a motor, a compressor, a fan, a valve, a pump, a piezoelectronic element and/or any other type of devices that are to be temperature-monitored and controlled based on temperature. When multiple controlled devices are used in a system, one or more of the controlled devices can be different than others of the devices in the system.

Figure 13A:
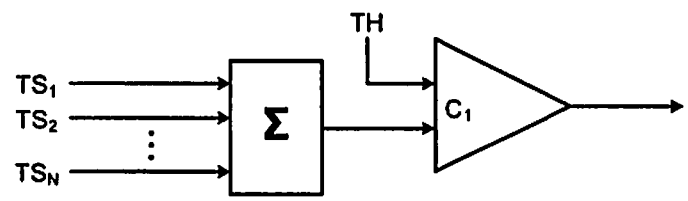
FIGS. 13A-13F illustrate exemplary systems for evaluating outputs of multiple temperature sensors and generating an output to control a controlled device.

Referring now to FIGS. 13A-13F, various systems for controlling the controlled device based on the outputs of the temperature sensing circuits are shown. In FIG. 13A, when a parallel arrangement of temperature sensing circuit are used, signals $TS_1$, $TS_2$, . . . , and $TS_N$ from the diodes can be summed by a summer and compared to a threshold. If the sum exceeds a threshold TH, a comparing circuit $C_1$ outputs a first operating state of the controlled device. Otherwise the comparing circuit $C_1$ outputs a second operating state. Alternately, the sum from the summer can be divided by a number of signals N and then compared to a threshold by the comparing circuit $C_1$. As can be appreciated, N may also be set equal to any other number. When N is equal to the number of signals, the arrangement in FIG. 13A uses an averaging approach.

Figure 13B:
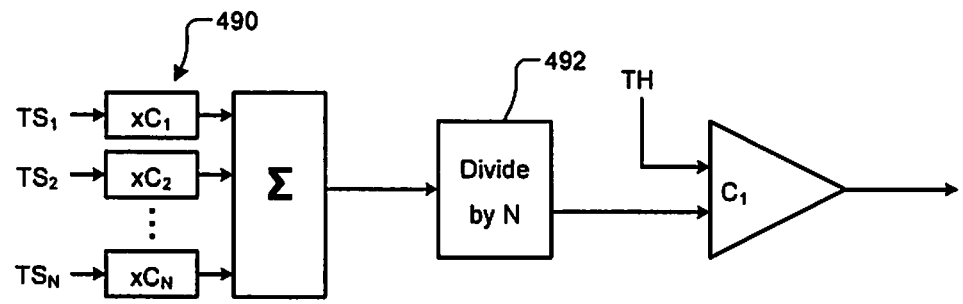

In FIG. 13B, a weighted averaging approach is shown. One or more of the signals $TS_1$, $TS_2$, . . . , and $TS_N$ can be weighted differently than others of the signals $TS_1$, $TS_2$, . . . , and $TS_N$. Therefore, multipliers 490 multiply one or more of the signals $TS_1$, $TS_2$, . . . , and $TS_N$ by a constant $C_1$, $C_2$, . . . , $C_N$, respectively. A division circuit 492 may divide by N (if desired) or another number before comparing to a threshold. For example, a temperature sensor arranged on an IC or SOC with the processor may be given a higher weight than other sensors arranged on less sensitive or costly components in a computer (as in FIG. 13B and other FIGS. herein.

Figure 13C:
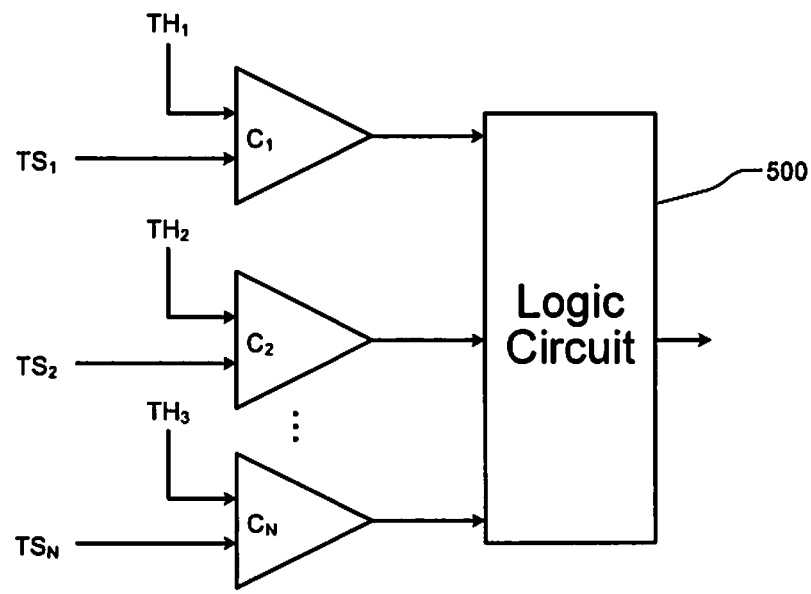

In FIG. 13C, each of the signals $TS_1$, $TS_2$, . . . , and $TS_N$ may be compared by comparing circuits $C_1$, $C_2$, . . . , and $C_N$ to a threshold $TS_1$, $TS_2$, and $TS_N$, respectively. Outputs of the comparing circuits $C_1$, $C_2$, . . . , and $C_N$ may be input to a logic circuit 500. The logic circuit 500 may include an AND or OR logic gate or more complex logic circuits. If any of the signals exceed the corresponding thresholds, the logic circuit 500 selects a first operating state of the controlled device. Otherwise, the second operate state is selected.

Figure 13D:
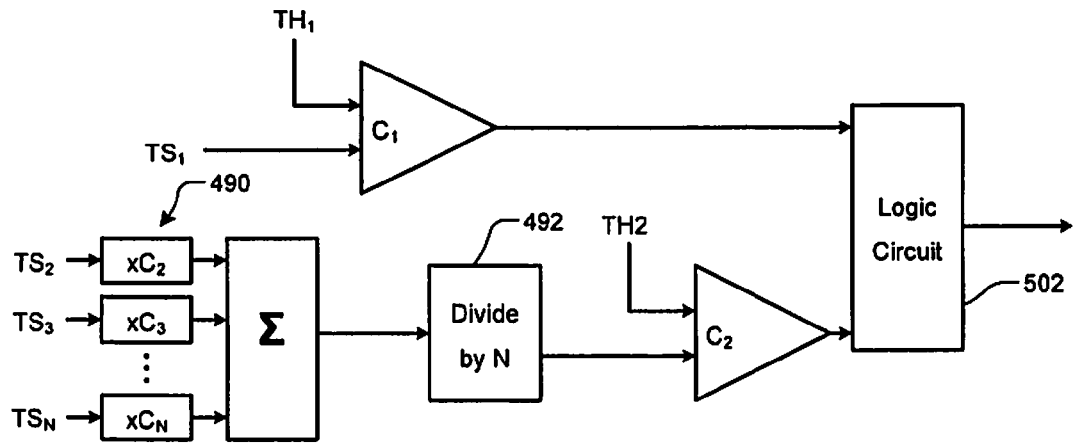

In FIG. 13D, one or more of the signals $TS_1$ may be compared to a threshold $TH_1$ by a comparing circuit $C_1$. An average or weighted average of the remaining signals $TS_2$, $TS_3$, . . . , and $TS_N$ may be compared to a threshold $TH_2$ by a comparing circuit $C_2$. Outputs of the comparing circuit $C_1$ and $C_2$ may be input to a logic circuit 502. For example, the logic circuit 502 may include an OR gate or more complex logic circuits.

Figure 13E:
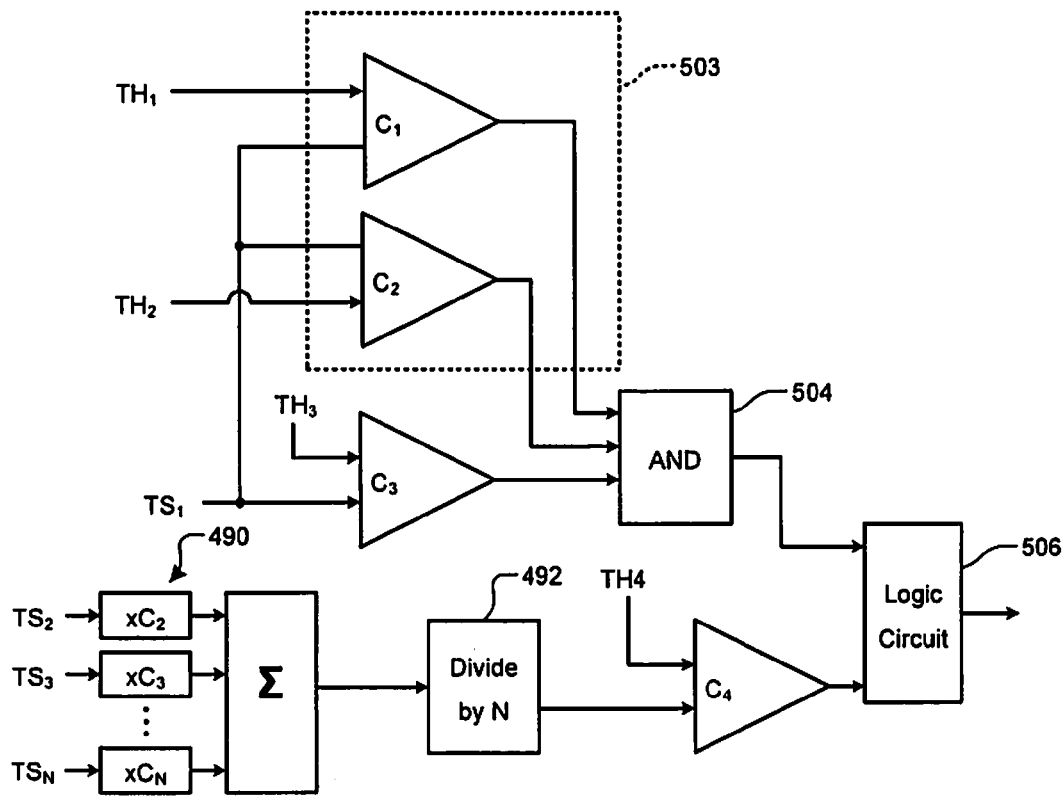

In FIG. 13E, one or more of the signals such as $TS_1$ in FIG. 13D may be compared by comparing circuits $C_1$ and $C_2$ to upper and lower limits $TH_1$ and $TH_2$ as generally indicated at 503. The comparison determines whether the signal is within an acceptable range. The signal $TS_1$ may also be compared to a threshold $TH_3$ by a comparing circuit $C_3$. An average or weighted average of the remaining signals $TS_2$, $TS_3$, . . . , and $TS_N$ may be compared to a threshold $TH_4$ by a comparing circuit $C_4$. Outputs of the comparing circuits $C_1$-$C_3$ may be input to a logic circuit 504. An output of the logic circuit 504 and an output of the comparing circuit $C_4$ may be input to a logic circuit 506. For example only, the logic circuit 504 may comprise an AND logic circuit and the logic circuit 506 may comprise an OR circuit, although more complex logic circuits may be used.

Figure 13F:
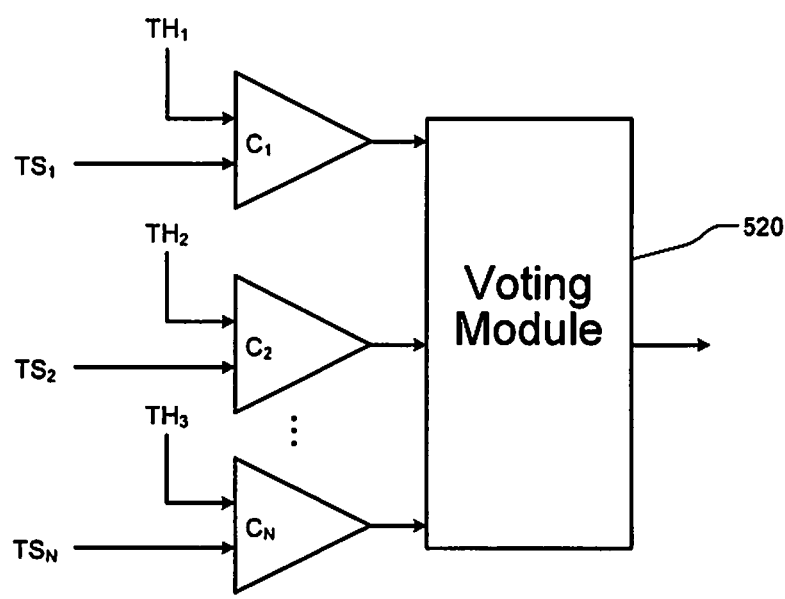

In FIG. 13F, each of the signals $TS_1$, $TS_2$, . . . , and $TS_N$ may be compared by comparing circuits $C_1$, $C_2$, . . . , and $C_N$ to a threshold $TH_1$, $TH_2$, . . . , and $TH_N$, respectively. Outputs of the comparing circuits $C_1$, $C_2$, . . . , and $C_N$ may be input to a voting module 520. The voting module 520 may use any voting approach. For example only, the voting module 520 may use M out of N criteria for controlling the controlled device. M and N are integers and M<=N. N may be equal to the number of signals. Still other voting approaches may be used.

As can be appreciated, various techniques shown and described above may be recombined into other approaches for evaluating the temperature signals and for selecting an operating state of the controlled device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A temperature sensing system, comprising:
   N temperature sensing circuits connected in series in different locations within a computing system, each including one of N diodes, wherein N is an integer greater than one; and
   a control module that includes a first terminal in communication with one of the N temperature sensing circuits, the control module configured to i) receive a combined voltage of the N temperature sensing circuits at the first terminal, and ii) calculate an average temperature of the N temperature sensing circuits based on the combined voltage.

2. The temperature sensing system of claim 1, wherein each of the N diodes includes a bipolar junction transistor (BJT).

3. The temperature sensing system of claim 1, wherein the control module is configured to determine a number of the N diodes based on the combined voltage.

4. The temperature sensing system of claim 3, wherein the control module is further configured to determine the number of the N diodes based on a known voltage for a single diode at a corresponding temperature.

5. The temperature sensing system of claim 3, wherein the control module is further configured to calculate the average temperature based on the number of the N diodes.

6. The temperature sensing system of claim 1, further comprising memory configured to store at least one of a previous combined voltage measurement value, a number of the N diodes, and a predicted temperature.

7. A system comprising the temperature sensing system of claim 1, and further comprising:
   a fan,
   wherein the control module is configured to operate the fan based on the calculated average temperature.

8. The system of claim 7, wherein the control module is configured to at least one of turn on the fan and increase an operating speed of the fan when the calculated average temperature is greater than a first threshold.

9. The system of claim 8, wherein the control module is configured to at least one of turn off the fan and decrease the operating speed of the fan when the calculated average temperature is less than a second threshold that is less than the first threshold.

10. The system of claim 7, wherein the control module includes:
    a voltage measurement module configured to measure the combined voltage;
    a temperature calculation module in communication with the voltage measurement module, the temperature calculation module configured to calculate the average temperature based on the combined voltage; and
    a fan motor control module in communication with the temperature calculation module, the fan motor control module configured to operate and the fan based on the average temperature.

11. The temperature sensing system of claim 1, wherein the computing system includes a housing, wherein the N temperature sensing circuits are arranged in the housing.

12. The temperature sensing system of claim 1, further comprising an appliance that includes a housing, wherein the N temperature sensing circuits are arranged in the housing.

13. The system of claim 7, wherein at least one of the N temperature sensing circuits is connected to at least one of a motor and a wiring connector of the fan.

14. The system of claim 7, wherein at least one of the N temperature sensing circuits is arranged at least one of on and within a housing of the fan.

15. The system of claim 7, wherein the control module is configured to at least one of turn the fan on and off and control an operating speed of the fan using the first terminal.

16. The system of claim 11, wherein the computing system includes at least one of a desktop personal computer (PC) and a laptop PC.

17. The temperature sensing system of claim 1, further comprising P sets of the N temperature sensing circuits, wherein diodes in each of the P sets of the N temperature sensing circuits are connected in series, each of the P sets of the N temperature sensing circuits is in communication with one of P external terminals of the control module, respectively, and P is an integer greater than zero.

18. A method for operating a temperature sensing system, the method comprising:
    providing N temperature sensing circuits connected in series in different locations within a computing system, each including one of N diodes, wherein N is an integer greater than one;
    communicating with one of the N temperature sensing circuits with a first terminal of a control module;
    receiving a combined voltage of the N temperature sensing circuits at the first terminal; and
    calculating an average temperature of the N temperature sensing circuits based on the combined voltage.

19. The method of claim 18, wherein each of the N diodes includes a bipolar junction transistor (BJT).

20. The method of claim 18, further comprising determining a number of the N diodes based on the combined voltage.

21. The method of claim 20, further comprising determining the number of the N diodes based on a known voltage for a single diode at a corresponding temperature.

22. The method of claim 20, further comprising calculating the average temperature based on the number of the N diodes.

23. The method of claim 18, further comprising storing at least one of a previous combined voltage measurement value, a number of the N diodes, and a predicted temperature.

24. The method of claim 18, further comprising operating a fan based on the calculated average temperature.

25. The method of claim 24, further comprising at least one of turning on the fan and increasing an operating speed of the fan when the calculated average temperature is greater than a first threshold.

26. The method of claim 25, further comprising at least one of turning off the fan and decreasing the operating speed of the fan when the calculated average temperature is less than a second threshold that is less than the first threshold.

27. The method of claim 24, further comprising:
    measuring the combined voltage at a voltage measurement module;
    calculating the average temperature based on the combined voltage at a temperature calculation module; and
    operating the fan based on the average temperature.

28. The method of claim 18, wherein at least one of the N temperature sensing circuits is connected to at least one of a motor and a wiring connector of a fan.

29. The method of claim 18, wherein at least one of the N temperature sensing circuits is arranged at least one of on and within a housing of a fan.

30. The method of claim 29, further comprising at least one of turning the fan on and off and controlling an operating speed of the fan using the first terminal.

31. The method of claim 18, further comprising:
 providing a fan; and
 operating the fan based on the calculated average temperature.

32. The method of claim 18, further comprising:
 providing an appliance that includes a fan; and
 operating the fan based on the calculated average temperature.

33. The method of claim 31, wherein the computer system includes at least one of a desktop personal computer (PC) and a laptop PC.

34. The method of claim 18, further comprising providing P sets of the N temperature sensing circuits, wherein diodes in each of the P sets of the N temperature sensing circuits are connected in series, each of the P sets of the N temperature sensing circuits communicates with one of P external terminals of the control module, respectively, and P is an integer greater than zero.

\* \* \* \* \*